United States Patent
Ishizawa et al.

(10) Patent No.: US 11,803,115 B2
(45) Date of Patent: Oct. 31, 2023

(54) LIGHT-EMITTING DEVICE AND PROJECTOR

(71) Applicants: SOPHIA SCHOOL CORPORATION, Tokyo (JP); SEIKO EPSON CORPORATION, Tokyo (JP)

(72) Inventors: Shunsuke Ishizawa, Tokyo to Shinjuku Ku (JP); Katsumi Kishino, Tokyo to Akiruno (JP)

(73) Assignees: SOPHIA SCHOOL CORPORATION, Tokyo (JP); SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/975,570

(22) Filed: Oct. 27, 2022

(65) Prior Publication Data

US 2023/0140772 A1    May 4, 2023

(30) Foreign Application Priority Data

Oct. 28, 2021 (JP) ................. 2021-176377

(51) Int. Cl.
*G03B 21/00* (2006.01)
*G03B 21/20* (2006.01)

(52) U.S. Cl.
CPC ............... *G03B 21/2033* (2013.01)

(58) Field of Classification Search
CPC .............................. G03B 21/2033
See application file for complete search history.

(56) References Cited

U.S. PATENT DOCUMENTS

| | | | |
|---|---|---|---|
| 2011/0169025 A1* | 7/2011 | Kishino | .......... H01L 31/035227 |
| | | | 257/E33.012 |
| 2020/0036163 A1* | 1/2020 | Nishioka | ................... H01S 5/11 |
| 2020/0266611 A1* | 8/2020 | Nagawa | ............... H01S 5/2018 |
| 2020/0274330 A1* | 8/2020 | Nagawa | ............... H01S 5/2031 |
| 2020/0412099 A1 | 12/2020 | Miyata | |
| 2020/0412100 A1 | 12/2020 | Miyata | |
| 2021/0126434 A1 | 4/2021 | Jiroku et al. | |
| 2021/0408765 A1 | 12/2021 | Ishizawa et al. | |

FOREIGN PATENT DOCUMENTS

| | | |
|---|---|---|
| JP | 2021007135 | 1/2021 |
| JP | 2021007136 | 1/2021 |
| JP | 2021072300 | 5/2021 |
| JP | 2022011468 | 1/2022 |

* cited by examiner

*Primary Examiner* — Gerald J Sufleta, II (74) *Attorney, Agent, or Firm* — JCIPRNET (57) ABSTRACT

A light-emitting device includes a substrate, a laminated structure having a plurality of column portions, and an electrode provided on a side of the laminated structure opposite from the substrate. Each of the plurality of column portions includes a light-emitting layer. The electrode is provided with a plurality of first holes. A diameter of each of the plurality of first holes is less than a wavelength of light generated by the light-emitting layer. A distance between adjacent first holes of the plurality of first holes is less than the wavelength of light generated by the light-emitting layer.

4 Claims, 7 Drawing Sheets

LIGHT-EMITTING DEVICE AND PROJECTOR

The present application is based on, and claims priority from JP Application Serial Number 2021-176377, filed Oct. 28, 2021, the disclosure of which is hereby incorporated by reference herein in its entirety.

BACKGROUND

1. Technical Field

The present disclosure relates to a light-emitting device and a projector.

2. Related Art

Semiconductor lasers are promising next-generation light sources having high luminance. In particular, semiconductor lasers to which nano-columns are applied are expected to be able to realize high-power light emission at a narrow radiation angle due to an effect of a photonic crystal derived from the nano-columns.

For example, JP-A-2021-7136 describes a light-emitting device including a plurality of column portions having a light-emitting layer and an electrode provided on the plurality of column portions. According to the description, by providing a plurality of holes in the electrode, light absorption can be reduced in proportion to the holes.

As an example of a method of further reducing light absorption in the electrode, it is conceivable to increase the diameter of holes provided in the electrode. However, when the diameter of holes is greater than the wavelength of light generated by the light-emitting layer, scattering of the light generated by the light-emitting layer in the holes may increase.

SUMMARY

One aspect of the light-emitting device according to the present disclosure includes
 a substrate,
 a laminated structure having a plurality of column portions, and
 an electrode provided on a side of the laminated structure opposite from the substrate, wherein
 each of the plurality of column portions includes a light-emitting layer,
 the electrode is provided with a plurality of first holes,
 a diameter of each of the plurality of first holes is less than a wavelength of light generated by the light-emitting layer, and
 a distance between adjacent first holes of the plurality of first holes is less than the wavelength of light generated by the light-emitting layer.

One aspect of the projector according to the present disclosure includes one aspect of the light-emitting device.

DESCRIPTION OF EXEMPLARY EMBODIMENTS

Hereinafter, preferred embodiments of the present disclosure will be described in detail with reference to the drawings. Note that the embodiments described hereinafter is not intended to unreasonably limit the content of the present disclosure as set forth in the claims. In addition, not all of the configurations described below are essential constituent requirements of the present disclosure.

1. Light-Emitting Device

1.1. Overall Configuration

Figure 1:
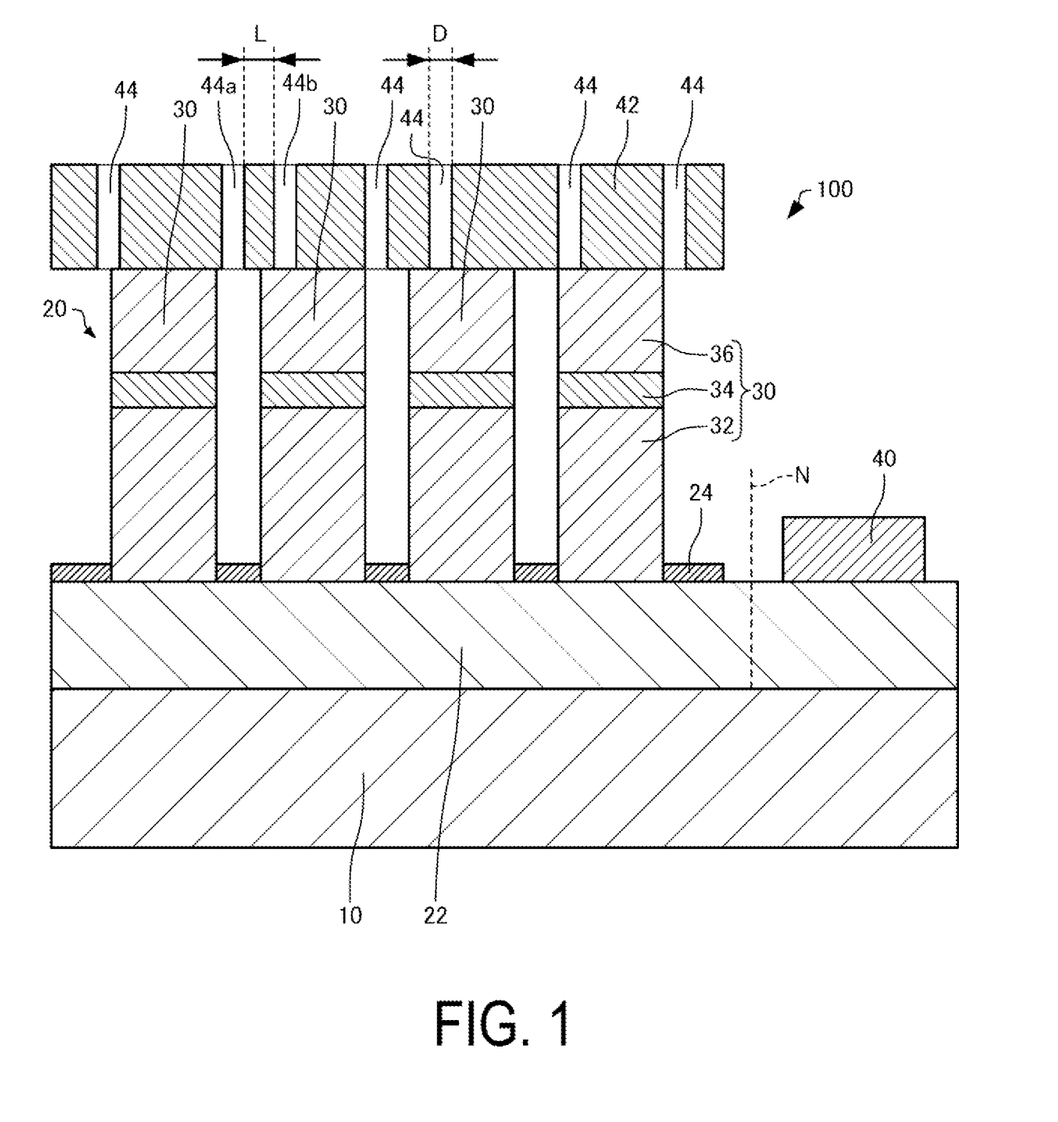
FIG. 1 is a cross-sectional view schematically illustrating a light-emitting device according to the present embodiment.
Figure 2:
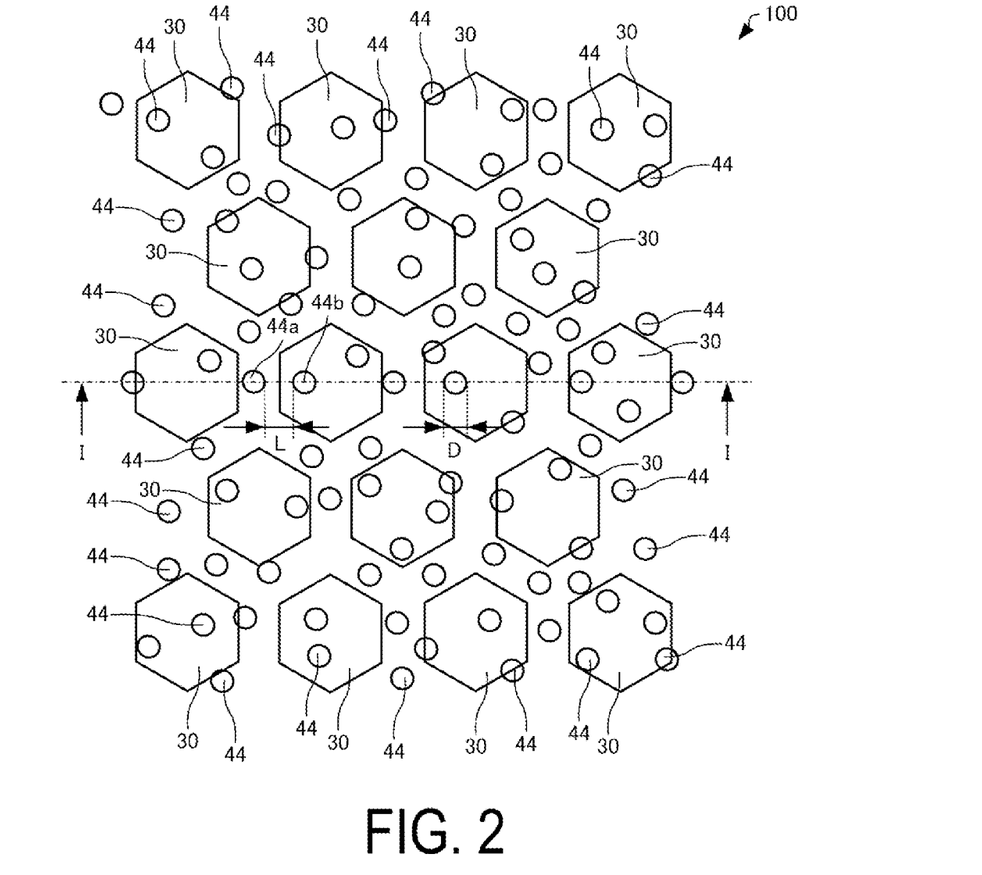
FIG. 2 is a plan view schematically illustrating column portions and first holes of a light-emitting device according to the present embodiment.

First, a light-emitting device according to the present embodiment will be described with reference to the drawings. FIG. 1 is a cross-sectional view schematically illustrating a light-emitting device 100 according to the present embodiment. FIG. 2 is a plan view schematically illustrating the light-emitting device 100 according to the present embodiment. Note that FIG. 1 is a cross-sectional view taken along a line I-I in FIG. 2.

As illustrated in FIG. 1, the light-emitting device 100 includes, for example, a substrate 10, a laminated structure 20, a first electrode 40, and a second electrode 42. The light-emitting device 100 is, for example, a semiconductor laser.

The substrate 10 is, for example, a Si substrate, a GaN substrate, a sapphire substrate, or a SiC substrate.

The laminated structure 20 is provided at the substrate 10. In the illustrated example, the laminated structure 20 is provided on the substrate 10. The laminated structure 20 includes, for example, a buffer layer 22 and a plurality of column portions 30. Note that for convenience, members in addition to the column portions 30 are not illustrated in FIG. 2.

In the present specification, when a light-emitting layer 34 of the column portion 30 is used as a reference along a lamination direction of the laminated structure 20 (hereinafter, also simply referred to as "lamination direction"), the direction from the light-emitting layer 34 toward a second semiconductor layer 36 of the column portion 30 is referred to as "upward", and the direction from the light-emitting layer 34 toward a first semiconductor layer 32 of the column portion 30 is referred to as "downward". A direction orthogonal to the lamination direction is referred to as "in-plane direction". Additionally, the phrase "lamination direction of laminated structure 20" refers to the lamination direction of the first semiconductor layer 32 and the light-emitting layer 34, which is the direction of a line N perpendicular to the substrate 10. Specifically, the phrase "line N perpendicular to substrate 10" refers to a line on the upper surface of the substrate 10.

The buffer layer 22 is provided on the substrate 10. The buffer layer 22 is, for example, an n-type GaN layer doped with Si. A mask layer 24 for growing the column portions 30 is provided on the buffer layer 22. The mask layer 24 is, for example, a titanium layer, a silicon oxide layer, a titanium oxide layer, or an aluminum oxide layer.

The column portions 30 are provided on the buffer layer 22. The column portions 30 have a columnar shape protruding upward from the buffer layer 22. In other words, the column portions 30 protrude upward from the substrate 10 with the buffer layer 22 interposed therebetween. The column portions 30 are also referred to as, for example, nano-columns, nano-wires, nano-rods, or nano-pillars. A planar shape of the column portion 30 is, for example, a polygon such as a hexagon, or a circle. In the example illustrated in FIG. 2, the planar shape of the column portion 30 is a regular hexagon.

A diameter of the column portion 30 is, for example, from 50 nm to 500 nm. By setting the diameter of the column portion 30 to be 500 nm or less, a light-emitting layer 34 of high quality crystals can be obtained, and a distortion inherent in the light-emitting layer 34 can be reduced. This makes it possible to amplify light generated in the light-emitting layer 34 with high efficiency.

Note that, when the planar shape of the column portion 30 is a circle, the phrase "diameter of column portion 30" refers to the diameter of the circle, and when the planar shape of the column portion 30 is not a circle, the phrase "diameter of column portion 30" refers to the diameter of the smallest circle containing the planar shape of the column portion 30. For example, when the planar shape of the column portion 30 is a polygon, the diameter of the column portion 30 is the diameter of the smallest circle containing the polygon, and when the plane shape of the column portion 30 is an ellipse, the diameter of the column portion 30 is the diameter of the smallest circle containing the ellipse.

The column portion 30 is provided in plurality. The spacing between adjacent column portions 30 is, for example, from 1 nm to 500 nm. The plurality of column portions 30 are arranged in a predetermined direction at a predetermined pitch when viewed from the lamination direction. The plurality of column portions 30 are arranged in, for example, a triangular lattice, or a square lattice. In the example illustrated in FIG. 2, the plurality of column portions 30 are arranged in a regular, triangular lattice. The plurality of column portions 30 can develop the effect of photonic crystal.

Note that the phrase "pitch of column portions 30" refers to a distance between centers of the column portions 30 adjacent to each other in a predetermined direction. When the planar shape of the column portion 30 is a circle, the phrase "center of column portion 30" refers to the center of the circle, and when the planar shape of the column portion 30 is not a circle, the phrase "center of column portion 30" refers to the center of the smallest circle containing the planar shape of the column portion 30. For example, when the planar shape of the column portion 30 is a polygon, the center of the column portion 30 is the center of the smallest circle containing the polygon, and when the plane shape of the column portion 30 is an ellipse, the center of the column portion 30 is the center of the smallest circle containing the ellipse.

As illustrated in FIG. 1, the column portion 30 includes, for example, the first semiconductor layer 32, the light-emitting layer 34, and the second semiconductor layer 36.

The first semiconductor layer 32 is provided on the buffer layer 22. The first semiconductor layer 32 is provided between the substrate 10 and the light-emitting layer 34. The first semiconductor layer 32 is a first conductive type semiconductor layer. The first semiconductor layer 32 is, for example, an n-type GaN layer doped with Si.

The light-emitting layer 34 is provided between the first semiconductor layer 32 and the second semiconductor layer 36. The light-emitting layer 34 generates light when an electric current is injected. The light-emitting layer 34 includes, for example, a well layer and a barrier layer. The well layer and the barrier layer are i-type semiconductor layers that are not intentionally doped with impurities. The well layer is, for example, an InGaN layer. The barrier layer is, for example, a GaN layer. The light-emitting layer 34 has a Multiple Quantum Well (MQW) structure including the well layer and the barrier layer.

Note that the numbers of the well layers and the barrier layers constituting the light-emitting layer 34 are not limited. For example, only one layer of the well layer may be provided, in which case the light-emitting layer 34 has a Single Quantum Well (SQW) structure.

The second semiconductor layer 36 is provided on the light-emitting layer 34. The second semiconductor layer 36 is provided between the light-emitting layer 34 and the second electrode 42. The second semiconductor layer 36 is a second conductive type semiconductor layer different from the first conductive type. The second semiconductor layer 36 is, for example, a p-type GaN layer doped with Mg. The first semiconductor layer 32 and the second semiconductor layer 36 are cladding layers having a function of confining light to the light-emitting layer 34.

Note that, although not illustrated, an Optical Confinement Layer (OCL) including an i-type InGaN layer and a GaN layer may be provided either between the first semiconductor layer 32 and the light-emitting layer 34 or between the light-emitting layer 34 and the second semiconductor layer 36, or both between the first semiconductor layer 32 and the light-emitting layer 34 and between the light-emitting layer 34 and the second semiconductor layer 36. Additionally, the second semiconductor layer 36 may have an Electron Blocking Layer (EBL) including a p-type AlGaN layer.

In the light-emitting device 100, the p-type second semiconductor layer 36, the i-type light-emitting layer 34 not intentionally doped with impurities, and the n-type first semiconductor layer 32 constitute a pin diode. In the light-emitting device 100, when a forward bias voltage of a pin diode is applied between the first electrode 40 and the second electrode 42, an electric current is injected into the light-emitting layer 34, and recombination of electrons and holes occurs in the light-emitting layer 34. This recombination causes light emission. The light generated in the light-emitting layer 34 propagates in an in-plane direction, forms a standing wave due to an effect of photonic crystal caused by the plurality of column portions 30, and receives a gain in the light-emitting layer 34 to generate laser oscillation. Then, the light-emitting device 100 emits+first order diffracted light and −first order diffracted light as laser light in the lamination direction.

Note that, although not illustrated, a reflection layer may be provided between the substrate 10 and the buffer layer 22, or below the substrate 10. The reflective layer is, for example, a Distributed Bragg Reflector (DBR) layer. The reflective layer can reflect light generated at the light-emitting layer 34, allowing the light-emitting device 100 to emit light only from the second electrode 42 side.

The first electrode 40 is provided on the buffer layer 22. The buffer layer 22 may be in ohmic contact with the first electrode 40. The first electrode 40 is electrically coupled to the first semiconductor layer 32. In the illustrated example, the first electrode 40 is electrically coupled to the first semiconductor layer 32 via the buffer layer 22. The first electrode 40 is one electrode for injecting an electric current into the light-emitting layer 34. The first electrode 40 that may be used is, for example, one obtained by stacking a Cr layer, an Ni layer, and an Au layer in this order from the buffer layer 22 side.

The second electrode 42 is provided on a side opposite to the substrate 10 of the laminated structure 20. The second electrode 42 is provided on the second semiconductor layer 36. The second semiconductor layer 36 may be in ohmic contact with the second electrode 42. The second electrode 42 is another electrode for injecting an electric current into the light-emitting layer 34. The second electrode 42 that may be used is, for example, Indium Tin Oxide (ITO) or the like.

Note that, although the description above is about a InGaN-based light-emitting layer 34, various types of material capable of emitting light when an electric current is injected can be used in the light-emitting layer 34 in accordance with the wavelength of light emitted. For example, AlGaN-based, AlGaAs-based, InGaAs-based, InGaAsP-based, InP-based, GaP-based, or AlGaP-based semiconductor materials can be used in the light-emitting layer 34.

1.2. First Holes Provided in Second Electrode

A plurality of first holes 44 are provided in the second electrode 42. The first holes 44 extend through the second electrode 42, for example. In the illustrated example, the first holes 44 extend through the second electrode 42 in the lamination direction. The first holes 44 are through holes. In the illustrated example, the first holes 44 are gaps. Note that, although not illustrated, the first holes 44 may be filled with a member having a refractive index lower than that of the second electrode 42.

A planar shape of the first hole 44 is, for example, a circle. Note that the shape of the first hole 44 may be an ellipse, or may be a polygon. In the example illustrated in FIG. 2, the plurality of first holes 44 have the same size as each other. The plurality of first holes 44 are separated from each other.

When viewed from the lamination direction, a diameter D of the first hole 44 is less than a wavelength of light generated by the light-emitting layer 34. The diameter D of the first hole 44 is less than a wavelength of the standing wave formed by the photonic crystal effect caused by the plurality of column portions 30. That is, the diameter D of the first hole 44 is less than the oscillation wavelength. The diameter D of the first hole 44 is less than the diameter of the column portion 30.

Note that, when the planar shape of the first hole 44 is a circle, the phrase "diameter D of first hole 44" refers to the diameter of the circle, and when the planar shape of the first hole 44 is not a circle, the phrase "diameter D of first hole 44" refers to the diameter of the smallest circle containing the planar shape of the first hole 44. For example, when the planar shape of the first hole 44 is a polygon, the diameter D of the first hole 44 is the diameter of the smallest circle containing the polygon, and when the plane shape of the first hole 44 is an ellipse, the diameter D of the first hole 44 is the diameter of the smallest circle containing the ellipse.

A distance between adjacent first holes 44 is less than the wavelength of light generated by the light-emitting layer 34. The distance between adjacent first holes 44 is less than the wavelength of the standing wave formed by the photonic crystal effect caused by the plurality of column portions 30. That is, the distance between adjacent first holes 44 is less than the oscillation wavelength. The distance between adjacent first holes 44 is less than a distance between adjacent column portions 30. When viewed from the lamination direction, the number of first holes 44 present per unit region of a predetermined shape is greater than the number of column portions 30 present per unit region of the predetermined shape.

The phrase "distance between adjacent first holes 44" refers to the shortest distance in a plan view from the lamination direction between one first hole 44 and another first hole 44 of the plurality of first holes 44 that is the closest to the one first hole 44. For example, a distance L, which is the distance between a first hole 44a of the plurality of first holes 44 and a first hole 44b of the plurality of first holes 44 that is the closest to the first hole 44a, is less than the wavelength of light generated by the light-emitting layer 34. In the illustrated example, in all the first holes 44, the distance between adjacent first holes 44 is less than the wavelength of light generated by the light-emitting layer 34.

The number of the first holes 44 is greater than the number of the column portions 30. The plurality of first holes 44 are not arranged periodically when viewed from the lamination direction. The plurality of first holes 44 are arranged at random, for example. In the illustrated example, viewed from the lamination direction, while there is a first hole 44 of the plurality of first holes 44 provided at a position overlapping with the column portion 30, there is also a first hole 44 of the plurality of first holes 44 provided at a position not overlapping with the column portion 30. The second electrode 42 may have a porous structure because the second electrode 42 is provided with the plurality of first holes 44. The plurality of column portions 30 are arranged periodically when viewed from the lamination direction. In the illustrated example, one column portion 30 overlaps with multiple first holes 44 when viewed from the lamination direction. The first hole 44 is provided between adjacent column portions 30.

1.3. Functions and Advantages

In the light-emitting device 100, each of the plurality of column portions 30 includes a light-emitting layer 34; a plurality of first holes 44 are provided in the second electrode 42; the diameter D of each of the plurality of first holes 44 is less than the wavelength of light generated by the light-emitting layer 34; and the distance between adjacent first holes 44 of the plurality of first holes 44 is less than the wavelength of light generated by the light-emitting layer 34. As such, in the light-emitting device 100, light generated by the light-emitting layer 34 is less likely to be affected by the first holes 44, and scattering of light generated by the light-emitting layer 34 in the first holes 44 can be reduced, when compared to a case in which a diameter of a first hole is greater than a wavelength of light, or in a case in which a distance between adjacent first holes is greater than a wavelength of light. Furthermore, the number of the first holes 44 per predetermined region can be increased, and thus absorption of light in the second electrode 42 can be reduced when compared to a case in which a distance between adjacent first holes is greater than a wavelength of light. Also, the resonance mode generated by the photonic crystal effect caused by the plurality of column portions 30 can be restrained from being disturbed by the first holes 44.

In the light-emitting device 100, each of the plurality of first holes 44 extends through the second electrode 42. As such, in the light-emitting device 100, the portion of the light-emitting device 100 with the second electrode 42 provided can have a smaller average refractive index in an in-plane direction when compared to a case in which the first holes do not extend through the second electrode. This can increase the optical confinement factor.

2. Method of Producing Light-Emitting Device

Figure 3:
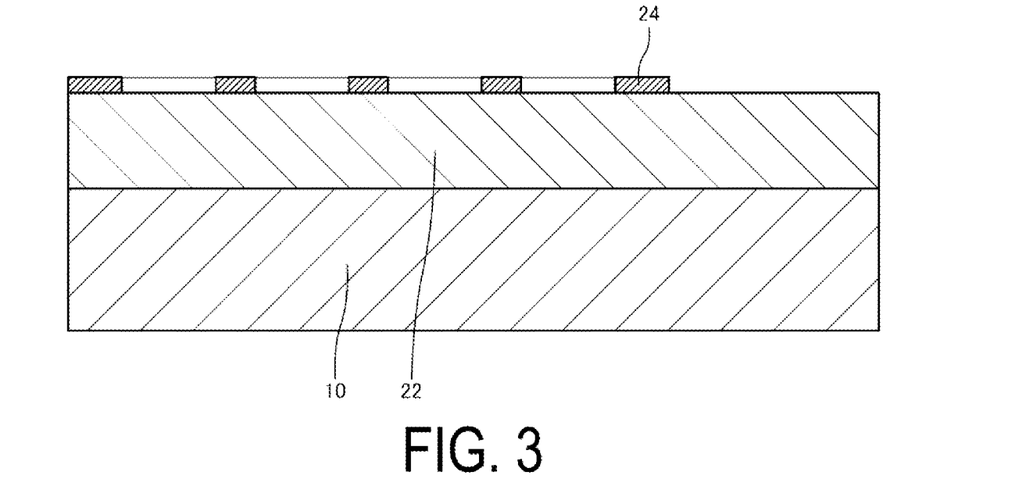
FIG. 3 is a cross-sectional view schematically illustrating a step of producing a light-emitting device according to the present embodiment.
Figure 4:
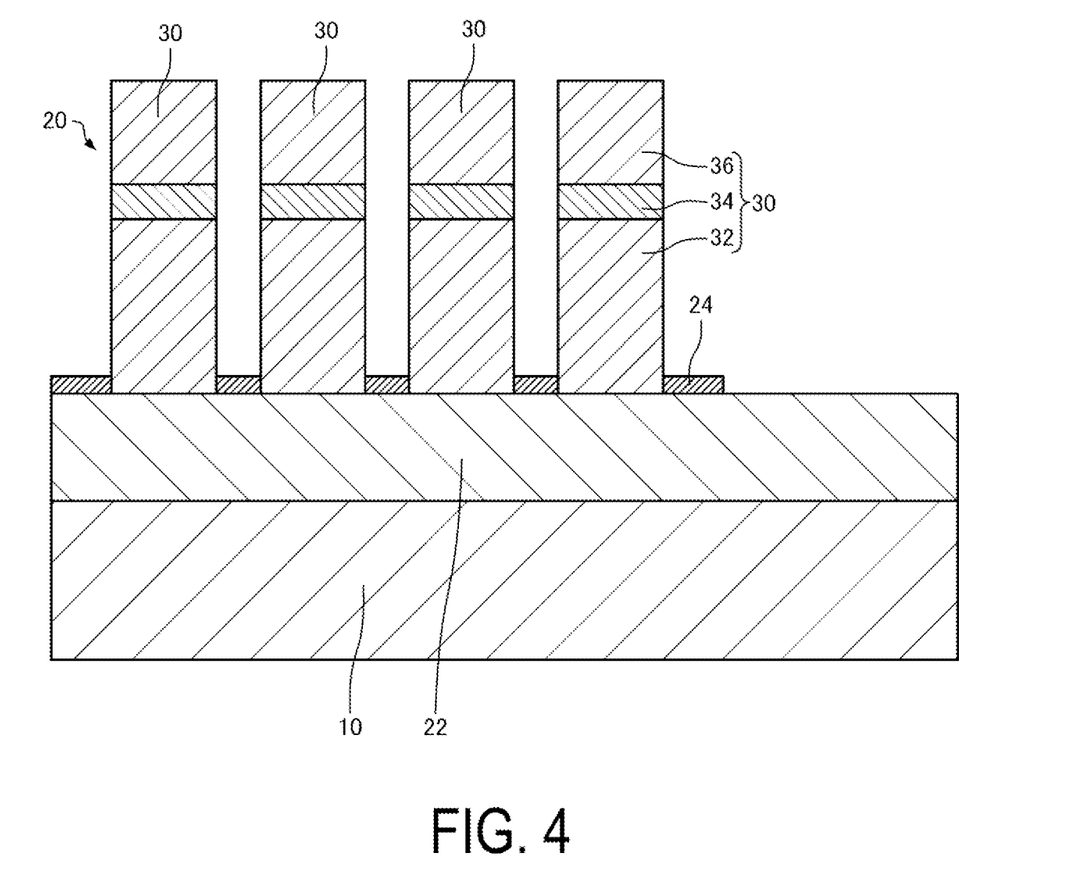
FIG. 4 is a cross-sectional view schematically illustrating a step of producing a light-emitting device according to the present embodiment.
Figure 5:
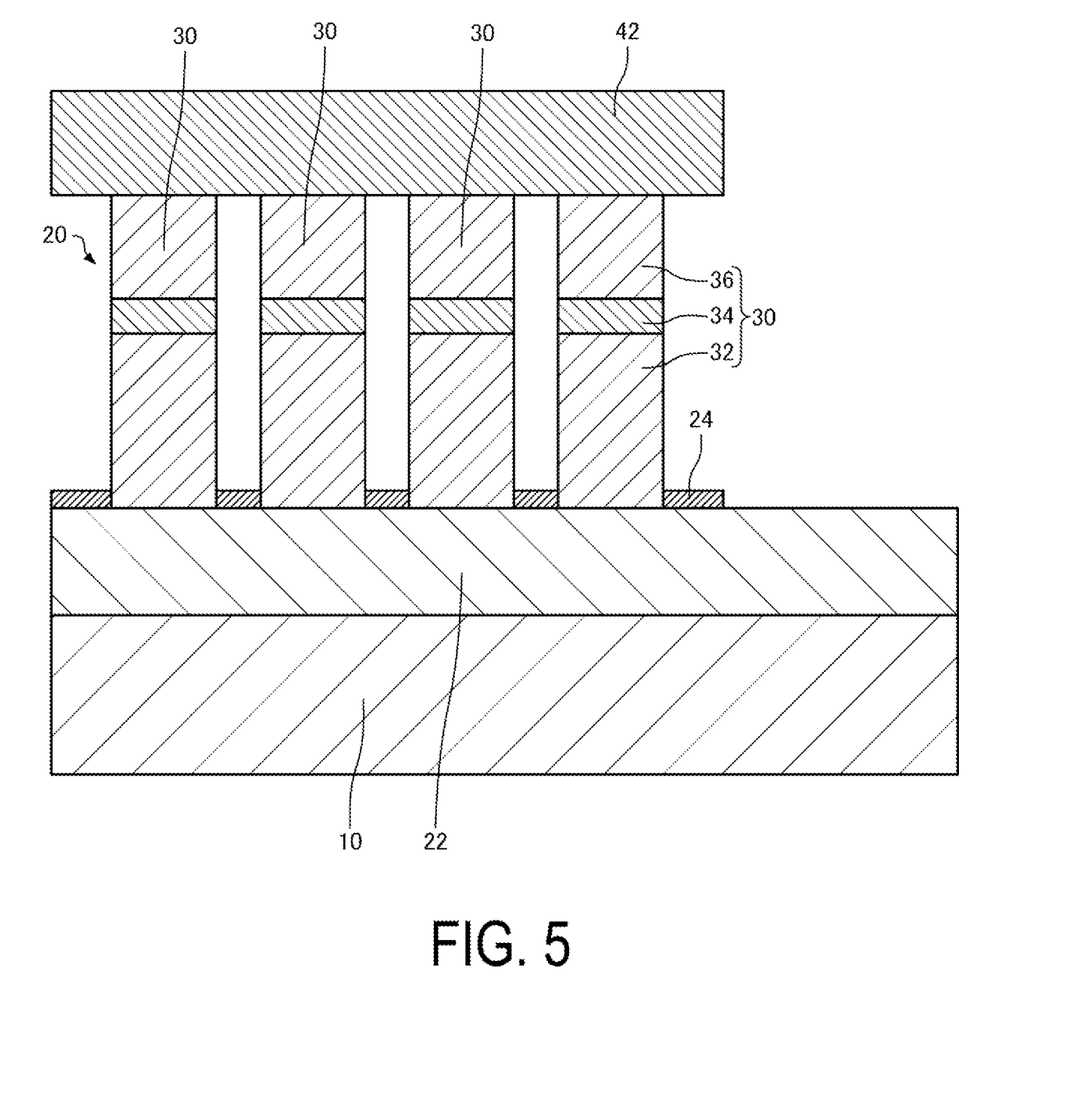
FIG. 5 is a cross-sectional view schematically illustrating a step of producing a light-emitting device according to the present embodiment.

Next, a method of producing the light-emitting device 100 according to the present embodiment will be described with reference to drawings. FIG. 3 to FIG. 5 are cross-sectional views schematically illustrating steps of producing the light-emitting device 100 according to the present embodiment.

As illustrated in FIG. 3, the buffer layer 22 is epitaxially grown on the substrate 10. Examples of the method for epitaxial growth include Metal Organic Chemical Vapor Deposition (MOCVD) and Molecular Beam Epitaxy (MBE).

Next, the mask layer 24 is formed on the buffer layer 22. The mask layer 24 is formed by, for example, film formation by electron-beam vapor deposition or sputtering, and patterning. Patterning is performed, for example, by electron-beam lithography and dry etching.

As shown in FIG. 4, the first semiconductor layer 32, the light-emitting layer 34, and the second semiconductor layer 36 are epitaxially grown in this order on the buffer layer 22 by using the mask layer 24 as a mask. Examples of the method for epitaxial growth include MOCVD and MBE. The present step can form a plurality of column portions 30.

As illustrated in FIG. 5, the second electrode 42 is formed on the second semiconductor layer 36. The second electrode 42 is formed, for example, by sputtering, or vacuum vapor deposition. In the step of forming the second electrode 42, oblique vapor deposition may be performed so that a material of electrode does not adhere to a side surface of the column portions 30.

As illustrated in FIG. 1, the second electrode 42 is patterned to form the plurality of first holes 44. Patterning is performed, for example, by electron-beam lithography and etching. The etching may be dry etching or wet etching, but wet etching can reduce the damage to the column portions 30.

Next, the first electrode 40 is formed on the buffer layer 22. The first electrode 40 is formed, for example, by sputtering, or vacuum vapor deposition. Note that the order of the step of forming the first electrode 40 and the step of forming the second electrode 42 are not limited.

The light-emitting device 100 can be produced by the above steps.

3. Variations of Light-Emitting Device

3.1. First Modified Example

Figure 6:
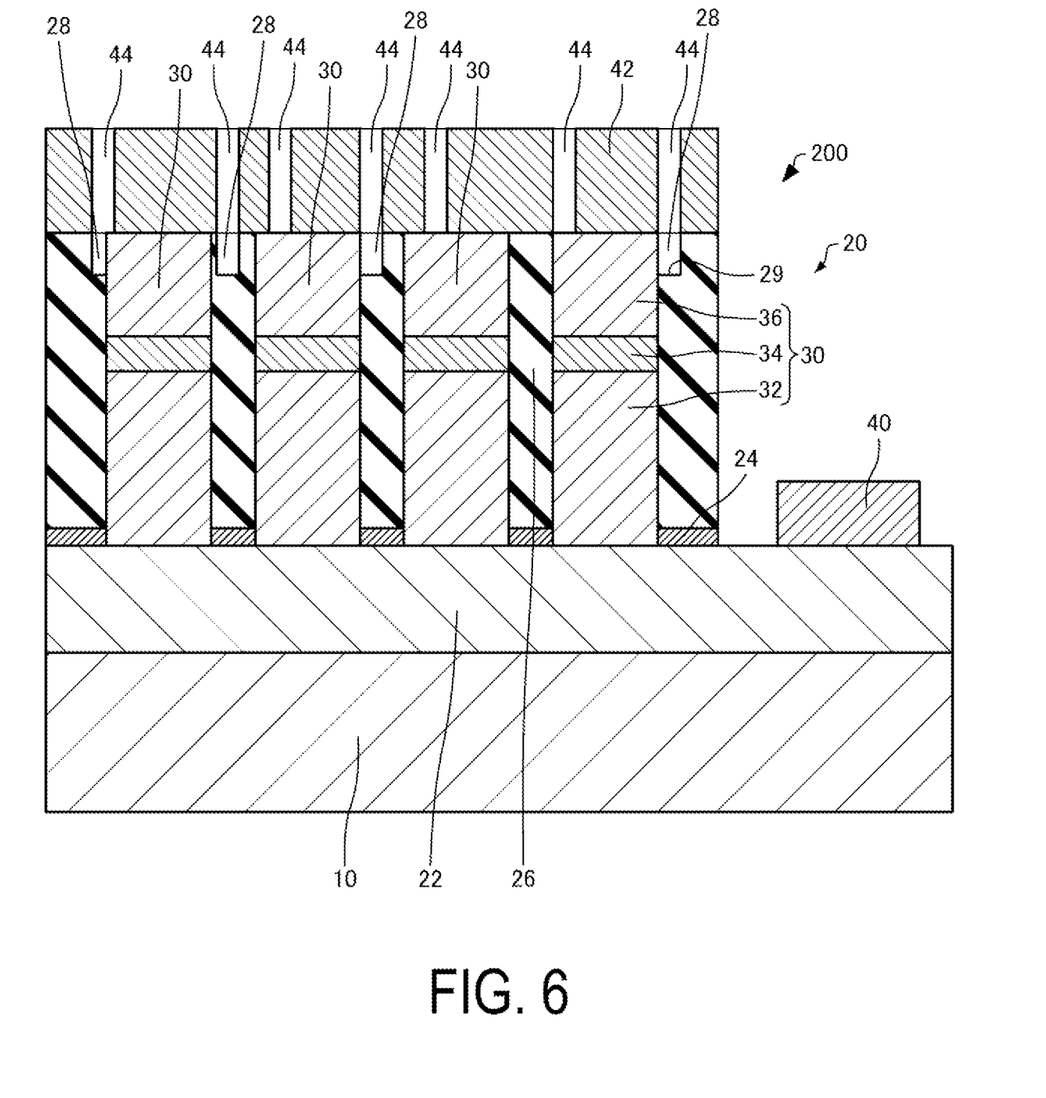
FIG. 6 is a cross-sectional view schematically illustrating a light-emitting device according to a first variation of the present embodiment.

Next, a light-emitting device 200 according to a first variation of the present embodiment will be described with reference to drawings. FIG. 6 is a cross-sectional view schematically illustrating the light-emitting device 200 according to the first variation of the present embodiment.

Hereinafter, members of the light-emitting device 200 according to the first variation of the present embodiment having the same functions as the components of the light-emitting device 100 according to the present embodiment described above will be denoted by the same reference numerals, and detailed description of such members will be omitted. The same applies to the light-emitting devices according to a second variation and a third variation of the present embodiment to be described below.

As illustrated in FIG. 1, in the light-emitting device 100 described above, a gap is provided between adjacent column portions 30.

In contrast, as illustrated in FIG. 6, in the light-emitting device 200, a laminated structure 20 includes a light propagation layer 26 provided between adjacent column portions.

The light propagation layer 26 is provided on a mask layer 24. The light propagation layer 26 is made of, for example, a dielectric material. Specifically, the light propagation layer 26 is a silicon oxide layer. More specifically, the light propagation layer 26 is a $SiO_2$ layer. Light generated by a light-emitting layer 34 propagates in the light propagation layer 26 in an in-plane direction.

A second hole 28 is provided in the light propagation layer 26. The second hole 28 is coupled with a first hole 44. The second hole 28 is provided in plurality. A bottom surface 29 of the second hole 28 is provided between the second semiconductor layers 36 of adjacent column portions 30. The second hole 28 is not provided between the light-emitting layers 34 of adjacent column portions 30. The second holes 28 do not extend all the way to the light-emitting layer 34 in the lamination direction. The bottom surface 29 is defined by the second semiconductor layer 36. In the illustrated example, the second holes 28 are gaps. Note that, although not illustrated, the second holes 28 may be filled with a member having a refractive index lower than that of the light propagation layer 26. Further, the second holes 28 may not be provided.

The light propagation layer 26 is formed by, for example, a CVD (Chemical Vapor Deposition) method, or a spin-coating method. The second holes 28 are formed by patterning the light propagation layer 26. The second holes 28 are formed, for example, continued from the first holes 44.

In the light-emitting device 200, the laminated structure 20 includes the light propagation layer 26 provided between adjacent column portions 30 of the plurality of column portions 30; the light propagation layer 26 is provided with the second hole 28; the second hole 28 is coupled with one of the plurality of first holes 44; and the bottom surface 29 of the second hole 28 is positioned between the second semiconductor layers 36 of adjacent column portions 30 of the plurality of column portions 30. As such, in the light-emitting device 200, the portion of the light-emitting device 200 with the second hole 28 provided can have a smaller average refractive index in an in-plane direction when compared to a case in which the second hole is not provided. This can increase the optical confinement factor. Furthermore, since the light propagation layer 26 is provided between adjacent column portions 30, adherence of a material of electrode to a side surface of the column portions 30 can be suppressed when the second electrode 42 is being formed.

3.2. Second Modified Example

Figure 7:
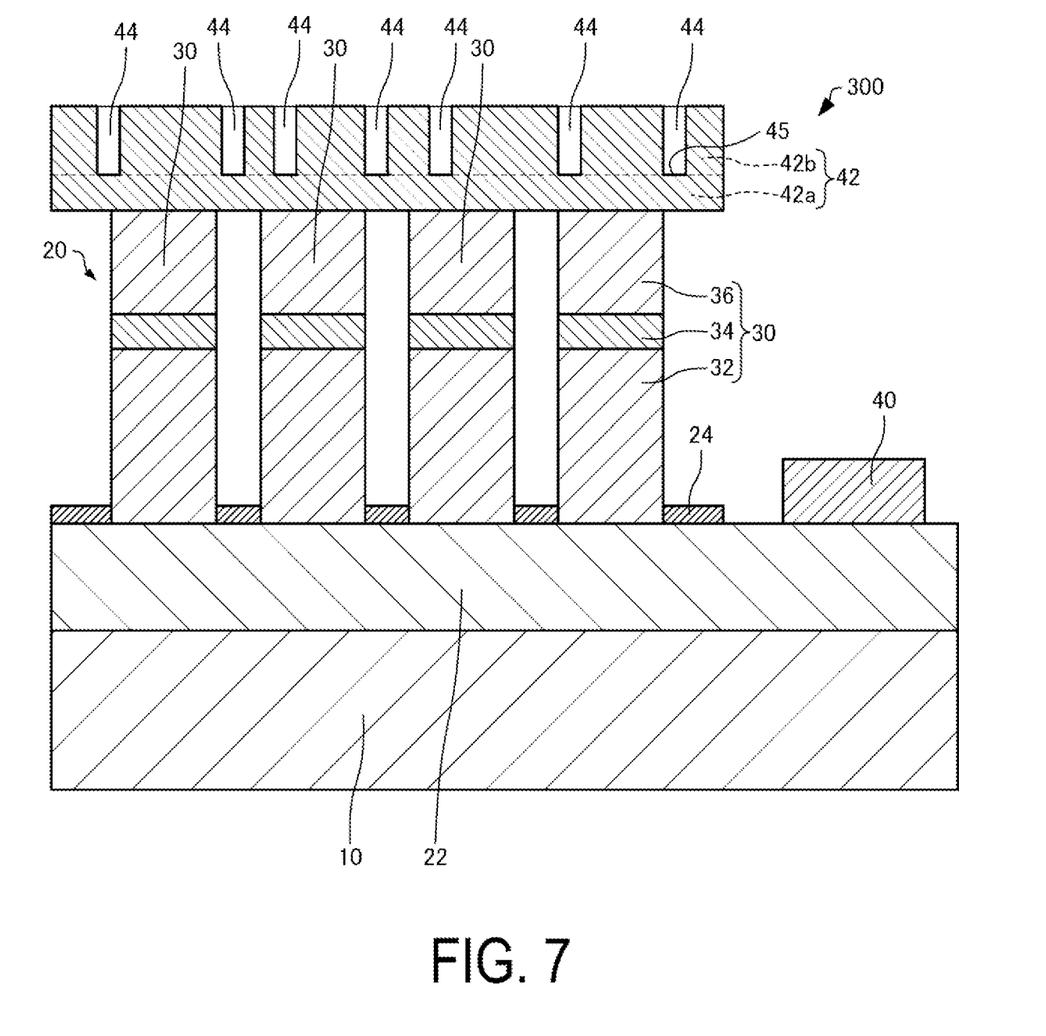
FIG. 7 is a cross-sectional view schematically illustrating a light-emitting device according to a second variation of the present embodiment.

Next, a light-emitting device 300 according to a second variation of the present embodiment will be described with reference to drawings. FIG. 7 is a cross-sectional view schematically illustrating the light-emitting device 300 according to the second variation of the present embodiment.

As illustrated in FIG. 1, in the light-emitting device 100 described above, the first holes 44 extend through the second electrode 42.

In contrast, as illustrated in FIG. 7, in the light-emitting device 300, first holes 44 do not extend through a second electrode 42. The first holes 44 are bottomed holes.

The second electrode 42 includes a first layer 42a not provided with the first holes 44 and a second layer 42b provided with the first holes 44. The first layer 42a is provided on a plurality of column portions 30. The first layer 42a defines bottom surfaces 45 of the first holes 44. The first layer 42a is provided between the plurality of column portions 30 and the second layer 42b. The second layer 42b is provided on the first layer 42a. The first holes 44 may be formed by dry etching, or may be formed by wet etching.

In the light-emitting device 300, each of the plurality of first holes 44 does not extend through the second electrode 42. As such, in the light-emitting device 300, damage to the column portions 30 caused by the etching for forming the first holes 44 can be suppressed.

3.3. Third Modified Example

Figure 8:
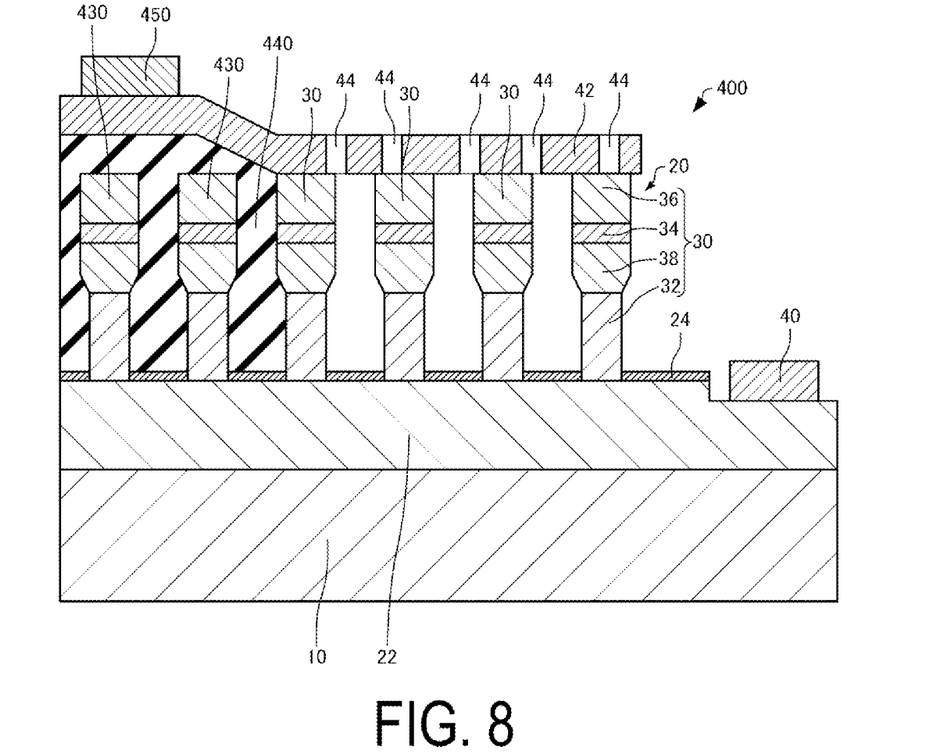
FIG. 8 is a cross-sectional view schematically illustrating a light-emitting device according to a third variation of the present embodiment.

Next, a light-emitting device 400 according to a third variation of the present embodiment will be described with reference to drawings. FIG. 8 is a cross-sectional view schematically illustrating the light-emitting device 400 according to the third variation of the present embodiment.

As illustrated in FIG. 1, in the light-emitting device 100 described above, the diameter of the first semiconductor layer 32 of the column portion 30 is the same as the diameter of the light-emitting layer 34 of the column portion 30.

In contrast, in the light-emitting device 400, as illustrated in FIG. 8, a diameter of a first semiconductor layer 32 of a column portion 30 is smaller than a diameter of a light-emitting layer 34 of the column portion 30. As a result, when compared to a case in which a diameter of the first semiconductor layer 32 of the column portion 30 is the same as a diameter of the light-emitting layer 34 of the column portion 30, the difference between the average refractive index in an in-plane direction in the portion of the light-emitting device 400 with the first semiconductor layer 32 provided and the average refractive index in an in-plane direction in the portion of the light-emitting device 400 with the light-emitting layer 34 provided can be increased. This can increase the optical confinement factor.

In the light-emitting device 400, the column portion 30 includes an optical confinement layer 38. The optical confinement layer 38 is provided on the first semiconductor layer 32. The optical confinement layer 38 is provided between the first semiconductor layer 32 and the light-emitting layer 34. In the illustrated example, the optical confinement layer 38 has a portion in which the diameter of the column portion 30 gradually increases from the first semiconductor layer 32 toward the light-emitting layer 34. The optical confinement layer 38 is composed of, for example, an i-type InGaN layer, or an i-type GaN layer. The In composition of the InGaN layer constituting the optical confinement layer 38 is smaller than the In composition of the InGaN layer constituting the light-emitting layer 34. The optical confinement layer 38 is an OCL that confines light to the light-emitting layer 34.

The light-emitting device 400 includes a dummy column portion 430 spaced apart from the second electrode 42. The dummy column portion 430 does not emit light. The configuration of the dummy column portion 430 is, for example, the same as the configuration of the column portion 30. The dummy column portion 430 is provided in plurality, for example. The dummy column portions 430 are grown in the same steps as those for the column portions 30, for example.

An insulating layer 440 is provided between the dummy column portions 430 and the second electrode 42. The insulating layer 440 surrounds the dummy column portions 430 when viewed from the lamination direction. The insulating layer 440 covers the dummy column portions 430. The insulating layer 440 is provided on a mask layer 24. The insulating layer 440 is, for example, a silicon oxide layer. More specifically, the insulating layer 440 is a $SiO_2$ layer. The insulating layer 440 is formed by, for example, CVD, or spin-coating.

In the illustrated example, the first electrode 40 is provided in a portion where the buffer layer 22 is partially removed. For example, a portion of the buffer layer 22 is etched, and the first electrode 40 is formed at the etched portion of the buffer layer 22.

An electrode pad 450 is provided on the second electrode 42. The electrode pad 450 overlaps with the dummy column portions 430 when viewed from the lamination direction. The electrode pad 450 contains, for example, titanium, or gold. Wire bonding that is not illustrated, for example, is used for coupling of the electrode pad 450. The electrode pad 450 is formed by, for example, CVD or sputtering.

4. Projector

Figure 9:
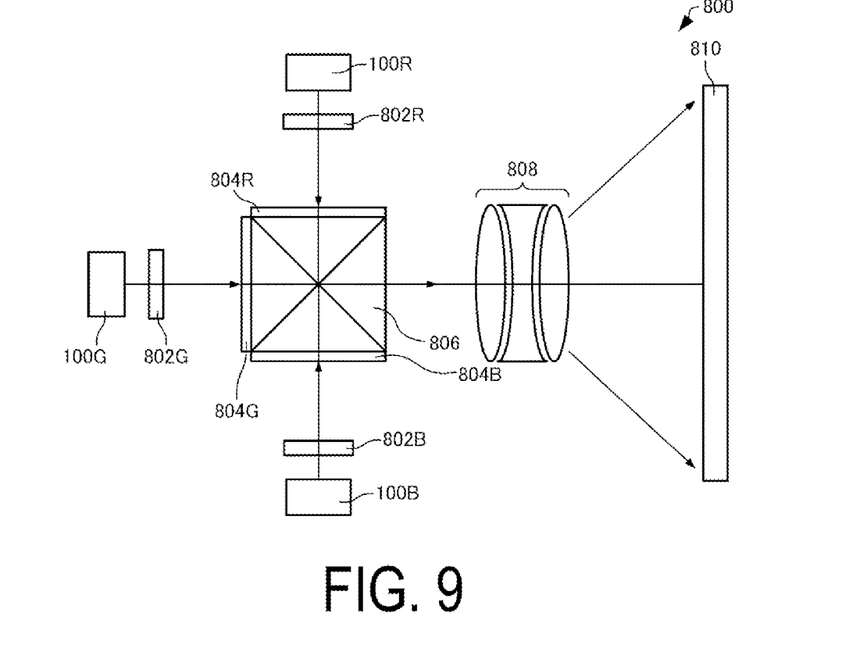
FIG. 9 is a diagram schematically illustrating a projector according to the present embodiment.

Next, a projector according to the present embodiment will be described with reference to drawings. FIG. 9 is a diagram schematically illustrating a projector 800 according to the present embodiment.

The projector 800 includes, for example, the light-emitting device 100 serving as a light source.

The projector 800 includes a housing that is not illustrated, a red light source 100R that emits red light, a green light source 100G that emits green light, and a blue light source 100B that emits blue light. The red light source 100R, the green light source 100G, and the blue light source 100B are provided in the housing. Note that, for convenience, the red light source 100R, the green light source 100G, and the blue light source 100B illustrated in FIG. 9 are simplified.

The projector 800 further includes, in the housing, a first optical element 802R, a second optical element 802G, a third optical element 802B, a first optical modulation device 804R, a second optical modulation device 804G, a third optical modulation device 804B, and a projection device 808. The first optical modulation device 804R, the second optical modulation device 804G, and the third optical modulation device 804B are, for example, a transmissive liquid crystal light valve. The projection device 808 is, for example, a projection lens.

Light emitted from the red light source 100R is incident on the first optical element 802R. The light emitted from the red light source 100R is condensed by the first optical element 802R. Note that the first optical element 802R may have a function in addition to condensing. The same applies to the second optical element 802G and the third optical element 802B described below.

The light condensed by first optical element 802R is incident on the first optical modulation device 804R. The first optical modulation device 804R modulates the incident light according to information of an image. The projection device 808 then expands an image formed by the first optical modulation device 804R and projects the expanded image to a screen 810.

Light emitted from the green light source 100G is incident on the second optical element 802G. The light emitted from the green light source 100G is condensed by the second optical element 802G.

The light condensed by the second optical element 802G is incident on the second optical modulation device 804G. The second optical modulation device 804G modulates the incident light according to information of an image. The projection device 808 then expands an image formed by the second optical modulation device 804G and projects the expanded image to the screen 810.

Light emitted from the blue light source 100B is incident on the third optical element 802B. The light emitted from the blue light source 100B is condensed by the third optical modulation device 802B.

The light condensed by the third optical element 802B is incident on the third optical modulation device 804B. The third optical modulation device 804B modulates the incident light according to information of an image. The projection device 808 then expands an image formed by the third optical modulation device 804B and projects the expanded image to the screen 810.

In addition, the projector 800 may include a cross dichroic prism 806 that synthesizes the light emitted from the first optical modulation device 804R, the light emitted from the second optical modulation device 804G, and the light emitted from the third optical modulation device 804B and guides the synthesized light to the projection device 808.

Lights of three colors modulated by the first optical modulation device 804R, the second optical modulation device 804G, and the third optical modulation device 804B are incident on the cross dichroic prism 806. The cross dichroic prism 806 is formed by bonding four right-angle prisms together; an inner surface of the cross dichroic prism 806 is provided with a dielectric multilayer film that reflects red light and a dielectric multilayer film that reflects blue light. These dielectric multilayer films synthesize the lights of the three colors to form light expressing a color image. The synthesized light is then projected onto the screen 810 by the projection device 808, and an enlarged image is displayed.

Note that the red light source 100R, the green light source 100G, and the blue light source 100B may directly form an image by controlling the light-emitting device 100 as a pixel of an image according to information of an image; in this scenario, the use of the first optical modulation device 804R, the second optical modulation device 804G, and the third optical modulation device 804B becomes unnecessary. Also, the projection device 808 may enlarge the image formed by the red light source 100R, the green light source 100G, and the blue light source 100B and project the enlarged image to the screen 810.

In addition, in the example described above, a transmissive liquid crystal light valve is used as the optical modulation device, but a light valve other than liquid crystal light valve may be used, or a reflective light valve may be used. Examples of such a light valve include a reflective liquid crystal light valve or a digital micro-mirror device. The configuration of the projection device is changed as appropriate depending on the type of the light valve used.

Further, the light source can be applied to a light source device of a scanning-type image display device having scanning means, the scanning means being an image formation device that displays an image of a desired size on a display surface by scanning light from the light source on a screen.

The light-emitting device according to the embodiment described above can also be used in applications in addition to projectors. Examples of applications in addition to projectors include indoor and outdoor lighting, displays, laser printers, scanners, automotive lights, sensing devices using light, light sources for communication devices, and display devices of head-mounted displays. Further, the light-emitting device according to the embodiment described above can also be applied to light emitting elements of Light Emitting Diode (LED) displays in which tiny light-emitting elements are arranged in an array to display an image.

The embodiment and variations described above are examples and are not serving as limitations. For example, the embodiment and variations can be combined as appropriate.

The present disclosure includes configurations that are substantially the same as a configuration described in an embodiment, such as configurations having the same function, method and result, or configurations having the same object and effect. Furthermore, the present disclosure includes configurations in which a non-essential part of a configuration described in an embodiment is replaced. The present disclosure also includes configurations having the same action and effect as a configuration described in an embodiment or configurations capable of achieving the same object. Further, the present disclosure includes configurations in which a known technology is added to a configuration described in an embodiment.

The following contents are derived from the above-described embodiment and variations.

One aspect of the light-emitting device includes:

a substrate, a laminated structure having a plurality of column portions, and an electrode provided on a side of the laminated structure opposite from the substrate, wherein each of the plurality of column portions includes a light-emitting layer, the electrode is provided with a plurality of first holes, a diameter of each of the plurality of first holes is less than a wavelength of light generated by the light-emitting layer, and a distance between adjacent first holes of the plurality of first holes is less than the wavelength of light generated by the light-emitting layer.

According to the light-emitting device, scattering of light generated by the light-emitting layer in the first holes can be reduced, and absorption of light in the electrode can be reduced.

In one aspect of the light-emitting device, each of the plurality of first holes may extend through the electrode.

According to the light-emitting device, an optical confinement factor can be increased.

In one aspect of the light-emitting device, each of the plurality of column portions may include:

a first semiconductor layer of a first conductive type, and a second semiconductor layer of a second conductive type that is different from the first conductive type, wherein the light-emitting layer may be provided between the first semiconductor layer and the second semiconductor layer, the first semiconductor layer may be provided between the substrate and the light-emitting layer, the laminated structure may include a light propagation layer provided between adjacent column portions among the plurality of column portions, the light propagation layer may be provided with a second hole, the second hole may be coupled with one of the plurality of first holes, and a bottom surface of the second hole may be positioned between the second semiconductor layers of adjacent column portions of the plurality of column portions.

According to the light-emitting device, an optical confinement factor can be increased.

In one aspect of the light-emitting device, each of the plurality of first holes may not extend through the electrode.

According to the light-emitting device, damage to the column portions 30 caused by the etching for forming the first holes can be suppressed.

One aspect of a projector includes one aspect of the light-emitting device.

What is claimed is:

1. A light-emitting device comprising:

a substrate, a laminated structure having a plurality of column portions, and an electrode provided on a side of the laminated structure opposite from the substrate, wherein each of the plurality of column portions includes a light-emitting layer, the electrode is provided with a plurality of first holes, a diameter of each of the plurality of first holes is less than a wavelength of light generated by the light-emitting layer, a distance between adjacent first holes of the plurality of first holes is less than the wavelength of light generated by the light-emitting layer, the laminated structure includes a light propagation layer provided between adjacent column portions of the plurality of column portions, and the light propagation layer is provided with a second hole.

2. The light-emitting device according to claim 1, wherein each of the plurality of first holes extends through the electrode.

3. The light-emitting device according to claim 2, wherein each of the plurality of column portions comprises:

a first semiconductor layer of a first conductive type, and a second semiconductor layer of a second conductive type that is different from the first conductive type, wherein the light-emitting layer is provided between the first semiconductor layer and the second semiconductor layer, the first semiconductor layer is provided between the substrate and the light-emitting layer, the second hole is coupled with one of the plurality of first holes, and a bottom surface of the second hole is positioned between the second semiconductor layers of adjacent column portions of the plurality of column portions.

4. A projector comprising the light-emitting device according to claim 1.

* * * * *